US009239611B2

(12) United States Patent
Kim et al.

(10) Patent No.: US 9,239,611 B2
(45) Date of Patent: Jan. 19, 2016

(54) METHOD, APPARATUS, AND SYSTEM FOR ENERGY EFFICIENCY AND ENERGY CONSERVATION INCLUDING BALANCING POWER AMONG MULTI-FREQUENCY DOMAINS OF A PROCESSOR BASED ON EFFICIENCY RATING SCHEME

(75) Inventors: Seongwoo Kim, Beaverton, OR (US); Jeremy Shrall, Portland, OR (US); Jay D. Schwartz, Aloha, OR (US); Stephen H. Gunther, Beaverton, OR (US); Travis C. Furrer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 13/311,467

(22) Filed: Dec. 5, 2011

(65) Prior Publication Data

US 2012/0173895 A1    Jul. 5, 2012

(51) Int. Cl.
*G06F 11/34* (2006.01)
*G06F 1/32* (2006.01)

(52) U.S. Cl.
CPC .............. *G06F 1/329* (2013.01); *G06F 1/3206* (2013.01); *G06F 11/3466* (2013.01); *Y02B 60/144* (2013.01)

(58) Field of Classification Search
CPC .............. G06F 1/3206; G06F 11/3409; G06F 11/3447; G06F 11/3466
USPC ........................... 713/300; 714/300, 320, 323
See application file for complete search history.

(56) References Cited

U.S. PATENT DOCUMENTS

| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,630,148 A | 5/1997 | Norris |
| 5,931,950 A | 8/1999 | Hsu |

(Continued)

FOREIGN PATENT DOCUMENTS

| EP | 1 282 030 A1 | 5/2003 |
| KR | 10-2008-011242 | 12/2008 |
| TW | 200919170 A | 5/2009 |

OTHER PUBLICATIONS

U.S. Appl. No. 12/889,121, "Providing Per Core Voltage and Frequency Control," filed Sep. 23, 2010, by Pakaj Kumar.

(Continued)

*Primary Examiner* — Jaweed A Abbaszadeh
*Assistant Examiner* — Alyaa T Mazyad
(74) *Attorney, Agent, or Firm* — Trop, Pruner & Hu, P.C.

(57) ABSTRACT

The efficiency rating (ER) of each domain, in a processor, may be compared and then the power budget may be allocated, effectively, among the domains based on the ERs of the domains. The ER may indicate relative advantage among domains in terms of performance return for a given power budget, i.e., a higher effectiveness may be expected in power utilization if the ER is higher for a domain. The ER of a domain may be defined as (scalability factor/cost factor*alpha). The scalability factor may be defined as a performance increase (in %) brought about by an increase in the clock frequency (in %) provided to the domain. The cost factor may be defined as a power budget value required in bringing about an increase in the clock frequency provided to the domain and alpha is an adjustment factor.

19 Claims, 4 Drawing Sheets

(56) References Cited

U.S. PATENT DOCUMENTS

| | | | |
|---|---|---|---|
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 2001/0044909 A1 | 11/2001 | Oh et al. | |
| 2002/0194509 A1 | 12/2002 | Plante et al. | |
| 2003/0037089 A1* | 2/2003 | Cota-Robles et al. | 709/1 |
| 2003/0061383 A1 | 3/2003 | Zilka | |
| 2004/0044915 A1 | 3/2004 | Bose et al. | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0060597 A1 | 3/2005 | Albonese et al. | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0074011 A1* | 3/2007 | Borkar et al. | 712/227 |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0104428 A1* | 5/2008 | Naffziger et al. | 713/300 |
| 2008/0250260 A1 | 10/2008 | Tomita | |
| 2009/0006871 A1 | 1/2009 | Liu et al. | |
| 2009/0013201 A1 | 1/2009 | He et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0022833 A1* | 1/2011 | Nussbaum et al. | 713/100 |
| 2011/0154090 A1 | 6/2011 | Dixon et al. | |
| 2012/0005513 A1* | 1/2012 | Brock et al. | 713/340 |
| 2013/0073875 A1* | 3/2013 | Anderson et al. | 713/300 |

OTHER PUBLICATIONS

SPEC-Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

Intel Developer Forum, IDF2010, Opher Kahn, et al., "Intel Next Generation Microarchitecture Codename Sandy Bridge: New Processor Innovations," Sep. 13, 2010, 58 pages.

U.S. Appl. No. 13/422,476, entitled "Managing Power Consumption in a Multi-Core Processor," filed Mar. 16, 2012 and which claims priority to Indian patent application No. 773/DEL/2011, filed on Mar. 21, 2011, by Eric Fetzer, et al.

International Searching Authority, "Notification of Transmittal of the International Search Report and the Written Opinion of the International Searching Authority," mailed Apr. 16, 2013, in International application No. PCT/US2012/068024.

Taiwan Patent Office, Office Action Mailed August 12, 2014, in Taiwan Application No. 101145637.

European Patent Office, Extended Search Report mailed Jun. 8, 2015, in European Patent Application No. 12855697.4.

* cited by examiner

| Domain 305 | Power budget 310 | Frequency Increase 320 | Cost Factor 330 |
|---|---|---|---|
| 101-A | 2 W | 100 MHz | 50MHz/watt |
| 101-B | 1.2 W | 100 MHz | 83.3MHz/watt |
| 101-C | 1 W | 100 MHz | 100MHz/watt |
| | | | |
| 101-K | 0.5 W | 75 MHz | 150MHz/watt |

| Domain 305 | Adjustment factor (Alpha) 410 |
|---|---|
| 101-A | 0.5 |
| 101-B | 0.5 |
| 101-C | 0.4 |
| | |
| 101-K | 0.6 |

METHOD, APPARATUS, AND SYSTEM FOR ENERGY EFFICIENCY AND ENERGY CONSERVATION INCLUDING BALANCING POWER AMONG MULTI-FREQUENCY DOMAINS OF A PROCESSOR BASED ON EFFICIENCY RATING SCHEME

FIELD

This disclosure pertains to energy efficiency and energy conservation in integrated circuits, as well as code to execute thereon, and in particular but not exclusively, to balance power among multi-frequency domains of a processor based on efficiency rating scheme.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume approximately 13% of the entire electricity supply for the United States of America. As a result, there is a vital need for energy efficiency and conservation associated with integrated circuits. And as servers, desktop computers, notebooks, ultra-books, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on The United States economy, as computing device related sales already have a large causal relationship with The United States Gross Domestic Product. Though specific statistics relevant to the United States of America have been presented here, the need for enhancing energy efficiencies and reducing energy or power consumption are applicable throughout the world.

For example, a computer system may comprise a processor, which may include multiple processing cores, an uncore area, a graphics processing unit, and many such processing blocks. One or more of these blocks may be operating on different and independent clock frequencies and may be, generally, referred to as "multi-frequency domains". And the multi-frequency domains may consume different power quantity out of a common package power budget. The contribution of each multi-frequency domain to the overall performance of the processor depends on each domain's workload sensitivity, which may vary dramatically over runtime. Thus, sharing the power budget among multi-frequency domains has to reflect such dynamic characteristics, holistically, at the chip level. Current techniques may not guarantee optimal distribution for a given power budget to achieve maximum efficiency in terms of performance and power.

For example, in some processors a driver associated with a second domain (e.g., GPU) may decide power biasing between a first domain (e.g., CPU) and a second domain although the driver has limited visibility into the first domain. Capability need for the first domain is predicted primarily based on second domain's utilization and frequency and such prediction may be an indirect speculation on the first domain's role in the budget allocation process and may not be ideal. While utilization may be a useful factor to consider but, it may not be sufficient to differentiate true power demand between domains. For instance, a workload may see the same utilization (e.g., 100%) for the two domains, but the workload may still rely on one domain much more than the other and may therefore create a complex problem in applying a limited power budget for the most return. In multi-tasking cases where two or more domains are shared by multiple programs/applications, effective budget distribution may be even more challenging.

A lack of useful metrics to enable cross domain evaluation and effective power budget balancing decisions may be critical for enhancing energy efficiency. As more and more components are being integrated into the same processor die or package, there may be a possibility of co-existence of many multi-frequency domains and the power budget allocation to these many multi-frequency domains may be even more important. Consequently, maintaining globally optimal power allocation among domains becomes increasingly difficult.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
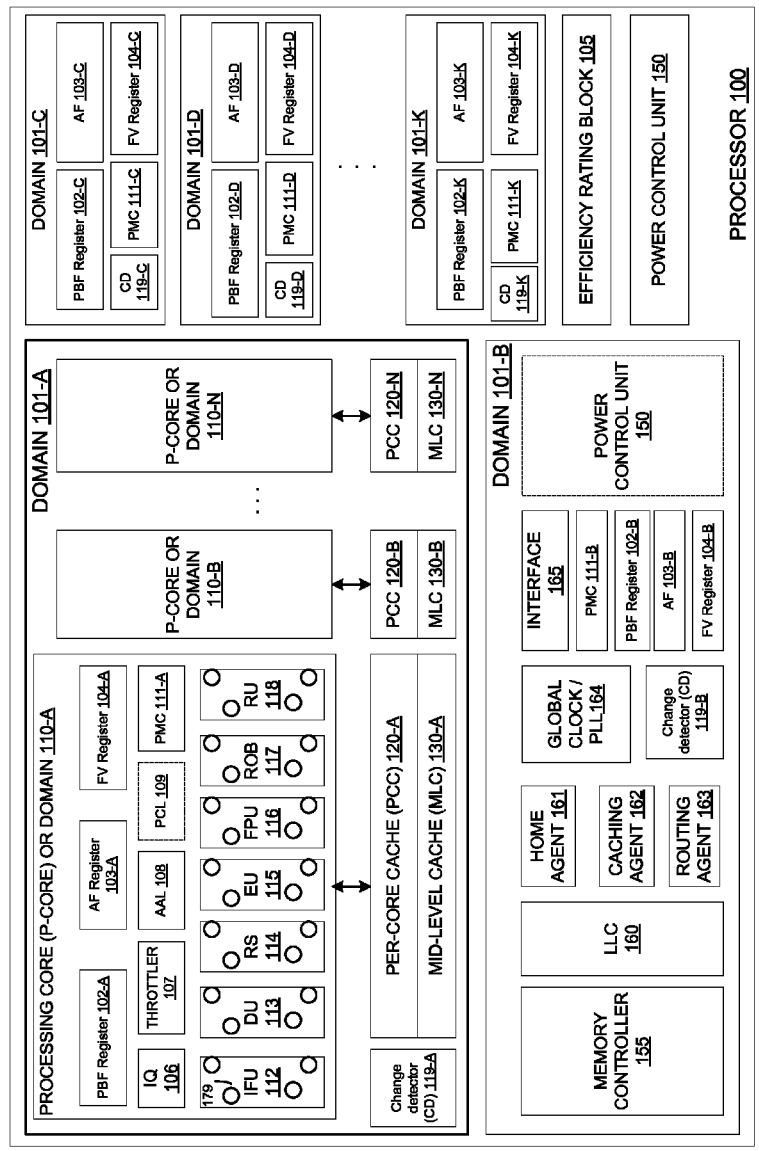
FIG. 1 illustrates a processor 100, which may support determination of efficiency rating of many multi-frequency domains and using such efficiency rating to allocate power budget to the many multi-frequency domains in accordance with one embodiment.

The following description describes embodiments of a technique to balance power among multi-frequency domains of a processor based on efficiency rating scheme. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop and laptop computer systems and may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US or world economy.

In one embodiment, the efficiency ratings of each domain may be compared and then the power budget may be allocated, effectively, among the domains based on the efficiency ratings of the domains. In one embodiment, the efficiency rating may indicate relative advantage among domains in terms of performance return for a given power budget, i.e., a higher effectiveness may be expected in power utilization if the efficiency rating is higher rating for a domain. In one embodiment, the efficiency rating of a domain may be defined as (scalability factor/cost factor*alpha). In one embodiment, the scalability factor may be defined as a performance increase (in %) brought about by an increase in the clock frequency (in %) provided to the domain.

In one embodiment, the scalability factor may represent scaling of workload's performance with a change in the clock frequency provided to the domain. In one embodiment, each of the domains may include performance monitoring counters (PMC) and the performance values stored in the PMCs may represent the performance of the domain. For example, the performance values stored in the PMCs may represent instruction throughput, processor utilization values, clock frequencies supported, and such other similar values. In one embodiment, the percentage increase in the performance values may be checked in response to a percentage increase in the frequency and the scalability factor may be determined.

In one embodiment, a cost factor may be defined as the power budget required to increase the clock frequency for a domain. For example, CPU may require 2 watts to get 100 MHz boost while GPU may need 1 watt to get 100 MHz boost. Even for a single domain, the cost factor may vary with the voltage and frequency. In one embodiment, the efficiency rating may be determined considering both the scalability factor and cost factor simultaneously to evaluate performance per unit of power for various domains. In one embodiment, a domain may be rated with a higher efficiency rating if a domain provides higher performance per power as compared to other domains. In one embodiment, each domain may include a cost factor table with the power budget values and frequency values. In other embodiment, the cost factor may be determined dynamically for each domain at regular intervals and the cost factor values may be updated at intervals of time.

Also, in one embodiment, an adjustment factor, 'alpha', may be used to make the efficiency rating comparable between all the domains. In one embodiment, the adjustment factor 'alpha' may be required to compensate for the diverse implementation constraints and accuracy for gathering scalability and cost factors for the domains. For example, a CPU core scalability metric of 0.5 may be, practically, equivalent to 0.4 scalability estimated for the GPU. In one embodiment, special weights may be rolled into the adjustment factor 'alpha'. In one embodiment, the alpha value for each domain may be provided as a table. Also, the alpha values may be refreshed or updated at intervals of time.

In one embodiment, the processor including several domains may also include an efficiency rating block and a power control unit. In one embodiment, the efficiency rating block may retrieve the performance metrics, frequency values, power budget required to boost or increase the frequency and alpha values from the registers and counters provided in each domain and then determine an efficiency rating for each domain. In one embodiment, the efficiency rating block may determine the efficiency rating value in response to change in the voltage and clock frequency values provided to the domain. As a result, the efficiency rating for the domains may change in response to any change in the voltage or frequency or any other such values provided to the domain. In one embodiment, the efficiency rating block may provide the efficiency rating values to the power control unit and the power control unit may allocate the power budget to each domain based on the efficiency rating values. In one embodiment, the power control unit may manage a power budget for multiple domains on a priority basis. For example, the power control unit may shift the power budget from a domain with poor efficiency rating to a domain with high efficiency rating such as that the maximum performance for the workload may be achieved at a common power cost. Also, the power control unit may prevent power wastage caused by limiting the allocation to a domain that gives no performance increase.

An embodiment of a processor 100, which may support determination of efficiency rating of many multi-frequency domains and using such efficiency rating to allocate power budget to the many multi-frequency domains illustrated in FIG. 1. In one embodiment, the processor 100 may comprise many multi-frequency domains such as domain 101-A, 101-B, 101-C, . . . 101-K. In one embodiment, the domain 101-A may represent a core area including multiple processing cores 110-A to 110-N, domain 101-B may represent an uncore area 105, domain 101-C may represent a graphics processing unit, and other domains may represent such functional blocks. In one embodiment, the core 105 and the uncore 150 may support a point-to-point bi-directional bus to enhance communication between the processing cores (p-cores) 110 and between the core area 105 and the uncore area 150. In one embodiment, the core area 105 may comprise processing cores such as p-core 110-A to 110-N, per-core caches 120-A to 120-N associated with the p-cores 110-A to 110-N, respectively, and mid-level caches 130-A to 130-N associated with the p-cores 110-A to 110-N, respectively.

In one embodiment, each of the p-cores 110 may include a power budget-frequency (PBF) register 102-A, adjustment factor (AF) register 103-A, a frequency value (FV) register 104-A, an instruction queue IQ 106, a throttler 107, an activity accumulation logic AAL 108, a power control logic PCL 109, a performance monitoring counter 111-A, an instruction fetch unit IFU 112, a decode unit 113, a reservation station RS 114, an execution unit EU 115, a floating point execution unit FPU 116, a re-order buffer ROB 117, and a retirement unit RU 118. In one embodiment, the PCL 109 may be provided within each domain or a centralized power control unit 150 may be provided to perform power budget allocation. In one embodiment, each P-core 110-A to 110-N may represent an independent domain. In other embodiments, all the p-cores 110-A to 110-N may together be referred to as a single independent domain if the each of the p-cores 110-A to 110-N operate in the same frequency domain. The efficiency rating and power allocation techniques described above are applicable to any of the scenarios described above and many other scenarios in which there are portions of the processor 100 operating at different clock frequency levels. Here, for brevity, all the p-cores 110-A to 110-N are represented as a single domain 101-A.

In one embodiment, each processor core 110-B to 110-N may include blocks that are similar to the blocks depicted in the processing core 110-A and the internal details of each of the processing cores 110-B to 110-N is not shown for brevity. In one embodiment, the per-core caches 120 may include memory technologies that may support higher access speeds, which may decrease the latency of instruction and data fetches, for example. In one embodiment, the uncore area 150 may include a memory controller 155, a last level cache LLC 160, a home agent HA 161, a caching agent CA 162, a routing agent RA 163, a global clock/PLL 164, an interface 165, and a power management unit 168.

In one embodiment, the activity sensors 179 may sense the activity occurring within the blocks IFU 112, DU 113, RS 114, EU 115, FPU 116, ROB 117, and RU 118 and provide the activity levels (architectural and data activity values) to the activity accumulation logic. In one embodiment, the activity sensors 179 may be provided in the data paths of each block within the processing core 110-A to enable the activity sensors 179 to detect the architectural and data activity values. In one embodiment, to control the power consumed by the core area 105, the AAL 108 may collect the activity levels sensed by the multiple activity sensors 179 and generate an accumulated activity value. In one embodiment, the activity accumulation logic AAL 108 may provide the accumulated activity value to the PCL 109 or the ERB 105.

In one embodiment, the PBF register 102-A may store a combination of power budget values and frequency values. In one embodiment, the power budget values may represent the power required to increase or boost the frequency of the domain 101-A and the frequency values represent such increase or boost in the frequency brought about by the power budget value. For example, the PBF register 102-A may store a power value of 2 W and a frequency value of 100 MHz and such a combination may mean that 2 Watts of power may be consumed by the domain 101-A to bring about an increase of 100 MHz in the clock frequency provided to the domain 101-A.

In one embodiment, the adjustment factor register AFR 103-A may include alpha values for each domain. For example, the adjustment factor (alpha) for the domain 101-A may be equal to 0.5. In one embodiment, the adjustment factor (alpha) may be used to determine the efficiency rating of each domain 101-A to 101-K. In one embodiment, the alpha value may be different for different domains. For example, the alpha value for the domain 101-A may be equal to 0.5 and it may be different from the alpha value of the domain 101-C, which may be 0.4.

In one embodiment, the frequency value (FV) register 104-A may store various frequency values, which may be provided to the domain 101-A. For example, the domain 101-A may be provided with various clock frequencies, which may be varied in steps. In one embodiment, the performance monitoring counter PMC 111-A may store performance values such as instruction throughput, clock frequencies supported, in-order or out-of-order processing, and such other similar parameters, which may represent performance parameters. In one embodiment, the performance values may vary with the change in clock frequency, which may be changed based on the frequency values stored in the FV register 104-A.

In one embodiment, the change detector (CD) 119-A may detect the changes in the values of voltage, current, frequency, or any other such parameters, provided to the p-core 110-A, which may alter the performance of the p-core 110-A. In one embodiment, the change detector 119-A may provide a change signal to the efficiency rating block 105 in response to a change in the parameter values(s) provided to the p-core 110-A.

In one embodiment, the other domains 101-B to 101-K may each include a PBF register, AF register, FV register, and PMC. For example, the domain 101-B may include a PBF register 102-B, a AF register 103-B, a FV register 104-B, and a PMC 111-B. Similarly, the domain 101-C may include PBF register 102-C, a AF register 103-C, a FV register 104-C, and a PMC 111-B, domain 101-D may include a PBF register 102-D, a AF register 103-D, FV register 104-D, and PMC 111-C)], and the domain 101-K may include a PBF register 102-K, a AF register 103-K, a FV register 104-K, and a PMC 111-K.

In one embodiment, the efficiency rating block ERB 105 may determine the efficiency rating for each domain 101-A to 101-K simultaneously or at the same time based on the values stored in the registers 102, 103, 104, and the performance monitoring counter PMC 111. In one embodiment, the efficiency rating block 105 may retrieve the values stored in the registers 102, 103, 104 and the PMC 111 in response to receiving a change signal or in other embodiment, the ERB 105 may determine the efficiency ratings for each domain 101 at regular intervals of time.

In one embodiment, the ERB 105 may determine the scalability factor for the domain 101-A after retrieving the performance values from the PMC 111-A and the percentage change in the frequency values based on the values stored in the register 104-A. In one embodiment, the ERB 105 may comprise logic blocks to determine the percentage change in the performance brought about by the percentage change in the frequency. In one embodiment, the scalability factor may equal (percentage change in the performance value/percentage change in the frequency value). For instance, if a 10% increase in the clock frequency provided to the domain 101-C (e.g., GPU) may result in 5% improvement in the performance or effectiveness in handling the workload. Therefore the scalability factor for the domain 101-C at 10% increase in frequency may be equal 0.5. In one embodiment, the scalability factor may range from 0.0 to 1.0. In one embodiment, the scalability factor may be directly related to the dependency of the workload of the domain 101-C.

In one embodiment, the operations for the workload within a domain (e.g., 101-C, GPU) may not generate critical-path events, which may have to be serviced by other domains (e.g., 101-A, CPU) if the workload scales perfectly with a domain's (101-C) frequency. As the operations in the domain 101-C (e.g., GPU) start waiting for the completion of events in other domains (e.g., 101-A-CPU), the contribution of the domain 101-C's frequency may become less to the workload. In one embodiment, there are unique micro-architectural events that can imply such inter-domain dependency. For instance, a GPU core (domain 101-C) may not make a good forward progress if its workload heavily relies on loading and storing data from/into memory subsystem (domain 101-B, for example). In other instance, CPU core's (domain 101-A) pipelines get halted if older CPU instructions cannot retire due to dependency on memory or IO transactions. Several such events recorded in the PMC may provide an insight into scalability factor of that domain. Some events may be common for multiple domains and others may be applicable to a single domain only. While exact selection and implementation of events may be specific to a product, it may be possible to track scalability factors for each domain using the values stored in the PMCs 111, for example. In one embodiment, the correlation between the PMC 111 and performance scalability may be performed using simulation or other statistical models and further tuning of the tracking mechanism on the silicon may be performed to increase the relevance of the values of the PMC to the scalability factors. Further, the above techniques may be combined with the software hints based on intrinsic knowledge of programs utilizing different domains. Even if multiple programs share a single domain in parallel, the same events can still show how smoothly the domain proceeds in the pipelines and a monitoring unit can roll the events up into an aggregated frequency scalability factor.

In one embodiment, the ERB 105 may further determine the cost factor based on the power budget values and the frequency values or may directly retrieve the cost factor values for the domain 101-A from the PBF register 102-A. In one embodiment, the cost factor may be defined as the power budget required to increase the clock frequency for the domain. For example, the domain 101-A (CPU) may require 2 watts to get 100 MHz boost while GPU may require 1 watt for the same raise. Even within a single domain, the cost factor may not be constant and it may vary in response to change in the voltage and frequency. Similar to tracking scalability factor, registers and counters may be used to estimate the cost factor for each domain 101-A to 101-K. In one embodiment, the efficiency ratings block 105 may determine the cost factor as a power budget required to an increase the clock frequency by a known value. In other embodiment, the ERB 105 may determine the cost factor as a boost or increase in the clock frequency due to increase of the power budget by a watt.

In one embodiment, the ERB 105 may retrieve the alpha value from the AF register 103-A. In one embodiment, the adjustment factor, alpha, may be used to make the efficiency rating comparable between all the domains as the implementation constraints and accuracy for gathering scalability factor and cost factor may be diverse for individual domains. For example, a CPU core's scalability factor of 0.5 may be practically equivalent to a scalability factor of 0.4 estimated for the GPU. For example, with all else equal, the frequency increase from a low current speed (e.g., 1.5 GHz) may have a higher potential for performance gain compared to starting from a high speed (e.g., 3.2 GHz). In one embodiment, the alpha may be even more important factor if the domains operate at different frequency ranges. In one embodiment, the ERB 105 may determine the efficiency ratings on a real time basis as the values of the parameters provided to the domains 101-A to 101-K may change. In one embodiment, the ERB 105 may determine the efficiency rating for the domain 101-A based on the scalability factor, cost factor, and alpha value. In one embodiment, the efficiency rating for the domain 101-A may be given by the Equation (1) below:

$$\text{(Efficiency Rating ER)}_{101\text{-}A} = \{[(\text{scalability factor})_{101\text{-}A}]/[(\text{cost factor})_{101\text{-}A} * (\text{adjustment factor 'alpha'})_{101\text{-}A}]\} \quad \text{Equation (1)}$$

wherein '/' represents a division operator and 'x' represents a multiplication factor In one embodiment, the ERB 105 may determine the efficiency rating for each domain 101-A to 101-K using the Equation (1) above but, the scalability factor, cost factor, and alpha values for that particular domain may be used. As a result, the ERB 105 may determine $(ER)_{101\text{-}A}$, $(ER)_{101\text{-}B}$, $(ER)_{101\text{-}C}$, ... $(ER)_{101\text{-}K}$ as the efficiency ratings for the domains 101-A, 101-B, 101-C ... 101-K, respectively. In one embodiment, the ERB 105 may provide the ER values to the power control unit 150.

In one embodiment, the power control unit 150 may allocate the power budget to the domains 110-A to 110-K based on the efficiency ratings. For example, the domain with a higher efficiency rating may be provided a maximum of the total power budget that may be required to complete the workload successfully. In one embodiment, the domain(s) with higher efficiency ratings may be provided the power budget on priority basis. In one embodiment, the power control unit 150 may sort the domains based on the efficiency ratings and allocate the power budget in that order. In other embodiment, the power control unit 150 may use the efficiency ratings as an input parameter to a control loop feedback mechanism such as proportional, integral, and derivative (PID) controllers. In one embodiment, the power control unit 150 may provide maximum power to a domain with higher efficiency rating, which may guarantee better performance gain as compared to other domains with lower efficiency rating. In one embodiment, the power control unit 150 may allocate the power budget to the domain with highest efficiency rating first until its efficiency rating drops below that of others domains or the power budget is exhausted.

It may be noted that the efficiency ratings of the domains change as the clock frequency provided to the domains change. In one embodiment, the techniques described above may provide the power control unit 150 (hardware, firmware, or software, or combinations thereof) with a global view, thus enabling an effective priority ordering for the domains 101-A to 101-K to enable comprehensive budget balancing decisions at the package level. Further, the efficiency rating metric may be applicable to multiple domains of the processor and may be scalable to many numbers of domains.

Figure 2:
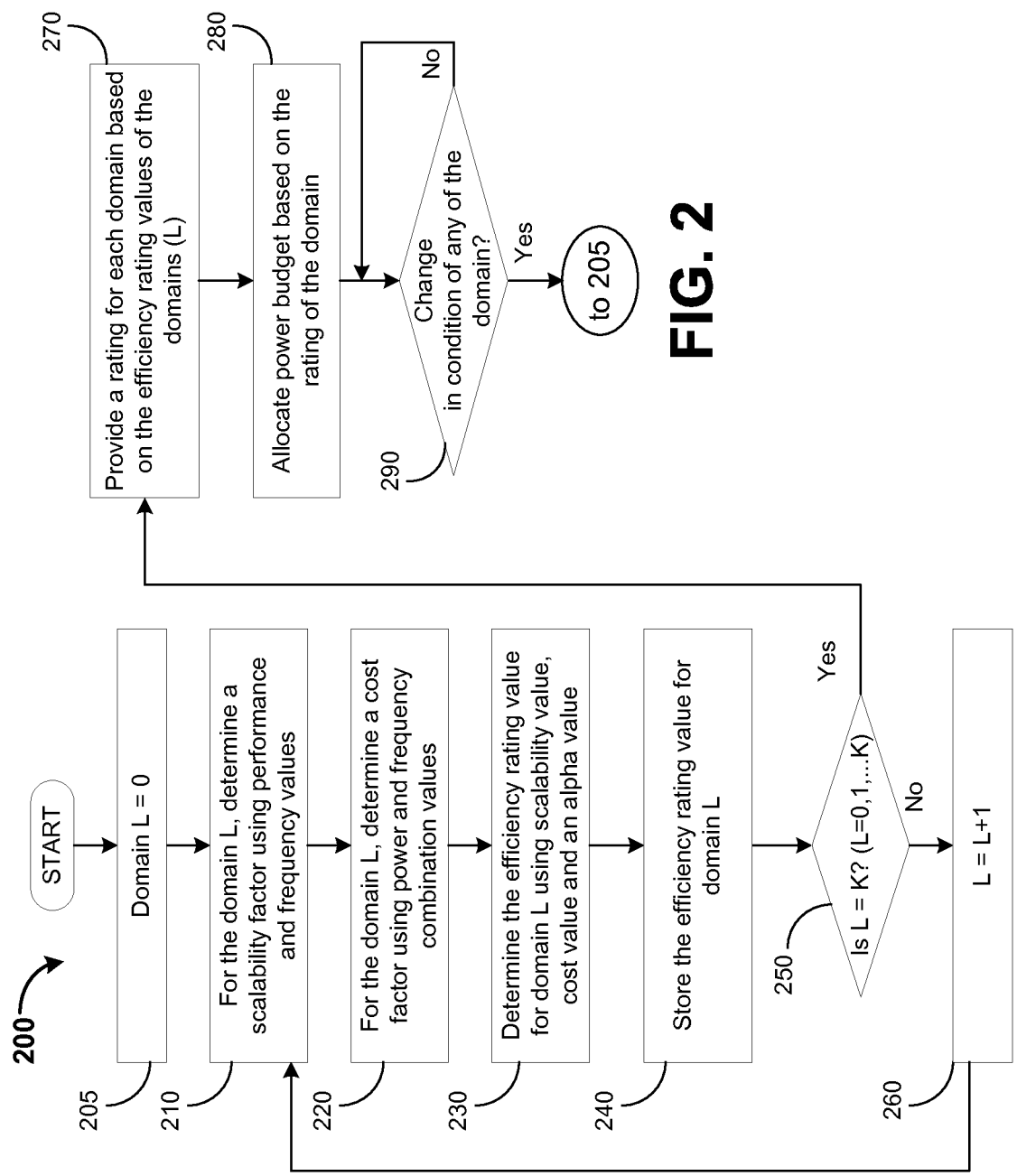
FIG. 2 is a flow-chart 200 illustrating the processor determining efficiency rating of many multi-frequency domains and using such efficiency rating to allocate power budget to the many multi-frequency domains in accordance with one embodiment.

A flow-chart illustrating the operation of the processor 100, which may determining efficiency rating of many multi-frequency domains and using such efficiency rating to allocate power budget to the many multi-frequency domains is illustrated in FIG. 2. In block 205, the ERB 105 may chose a domain for which the efficiency rating may be determined. For example, the ERB 105 may chose a domain 101-A (pointer to the domain L=0).

In block 210, the ERB 105 may determine the scalability factor for the domain 101-A using the performance values stored in the PMC 111-A and the FV register 104-A as described above.

In block 220, the ERB 105 may determine the cost factor for the domain 101-A based on the values stored in the PBF register 102-A as described above.

In block 230, the ERB 105 may determine the efficiency rating for the domain 110-A based on the scalability factor, cost factor, and the alpha value. In one embodiment, the efficiency rating may be determined as given in Equation (1) above.

In block 240, the ERB 105 may store the efficiency rating value for the domain 101-A. In block 250, the ERB 105 may check if L=K, wherein K represents the number of domains available in the processor 100 and control passes to block 260 if the L is less than K and to block 270 if L=K.

In block 260, the ERB 105 may increment the value of L and as the result, the domain 101-B may be chosen. Control passes back to block 210 and the blocks 210 to 250 are performed for the domain 101-B. Though the operation is shown here as sequential, the determination of efficiency ratings for the domains 101-A to 101-K may be performed in parallel on various independent threads or processes to determine the efficiency ratings of the domains 101-A to 101-K, simultaneously or substantially simultaneously.

In block 270, the ERB 105 may rate the domains 101-A to 101-K based on the efficiency ratings of the domains and such ratings may be provided to the power control unit 150. Alternatively, the efficiency ratings may be provided to the power control unit 150, directly.

In block 280, the power control unit 150 may allocate the power budget among the domains 101-A to 101-K based on the efficiency ratings of the domains 101-A to 101-K.

In block 290, the ERB 105 may check if the condition of any of the domains 101-A to 101-K has changed and control passes to block 205 in response to a change in the condition, which may be change in the voltage, current, temperature, clock frequency or any other such parameters affecting the performance of the domains 101-A to 101-K.

Figures 3, 4, 5, 6:
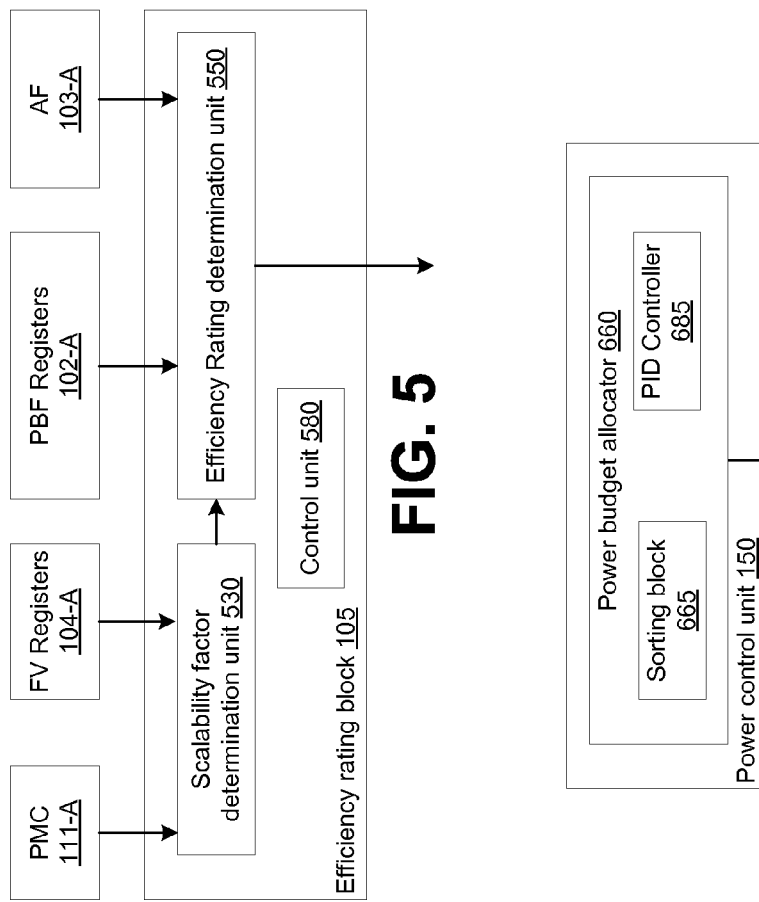
FIG. 3 illustrates a table 300, which provides a cost factor for each domain in accordance with one embodiment.
FIG. 4 illustrates a table 400, which provides an adjustment factor for each multi-frequency domain in accordance with one embodiment.
FIG. 5 illustrates an efficiency rating block, which may determine efficiency ratings of many multi-frequency domains in accordance with one embodiment.
FIG. 6 illustrates a power control unit, which may use the efficiency ratings to allocate power budget to the many multi-frequency domains in accordance with one embodiment.

FIG. 3 illustrates a table 300, which provides a cost factor for each domain in accordance with one embodiment. Table 300 may include four columns domain 305, power budget 310, frequency increase 320, and cost factor 330 and 'k' rows 350-1 to 350-K. In one embodiment, the row 350-1 may comprise 101-A, 2 Watts, 100 MHz, and 50 MHz/watt in the columns 305, 310, 320, and 330, respectively. In one embodiment, for the domain 101-A (in column 305) a power budget of 2 watts (as indicated in column 310) may be required to increase the clock frequency by 100 MHz (as indicated in the column 320). In one embodiment, the cost factor may be determined by dividing the frequency value (100 MHz, as in column 320) by the power budget value (2 watts, as in column 330). In one embodiment, the cost factor for the domain 101-A may be equal to 50 MHz per watt (=100 MHz/2 watt).

Similarly, the cost factor for the domains 101-B, 101-C, . . . 101-K, as depicted in rows 350-2, 350-3, . . . 350-k, may equal 83.33 MHz per watt (=100 MHz/1.2 watts), 100 MHz per watt (100 MHz/1 watt), and 150 MHz per watt (=75 MHz/0.5 watt), respectively. As noted above, the cost factor may vary with the change in values of the parameters such as voltage, frequency, temperature, current, and such other parameters. In one embodiment, the table 300 may be updated or refreshed at regular intervals of time or in response to a change in the parameter value provided to one or more domains.

In one embodiment, the efficiency ratings block 105 may determine the cost factor as a power budget (X) required to an increase the clock frequency by a known value (Y). For example, the ERB 105 may determine the power budget required to boost the clock frequency by 100 MHz. In other embodiment, the ERB 105 may determine the cost factor as a boost or increase in the clock frequency due to increase of the power budget by a watt. For example, the ERB 105 may determine the cost factor as a boost in the clock frequency brought about by an increase in the power budget by a watt.

FIG. 4 illustrates a table 400, which provides an adjustment factor for each multi-frequency domain in accordance with one embodiment. Table 400 may include two columns domain 405 and adjustment factor (alpha) 410 and 'k' rows 450-1 to 450-K. In one embodiment, the row 450-1 may, respectively, comprise 101-A and 0.5 in the columns 405 and 410. In one embodiment, for the domain 101-A (in column 405) the alpha value is 0.5. Similarly, the alpha value for the domains 101-B, 101-C, . . . 101-K, as depicted in rows 450-2, 450-3, . . . 450-k, may equal 0.5, 0.4, and 0.5, respectively. In one embodiment, the table 400 may be updated or refreshed at regular intervals of time or in response to a change in the alpha value of one or more domains.

FIG. 5 illustrates an efficiency rating block, which may determine efficiency ratings of many multi-frequency domains in accordance with one embodiment. In one embodiment, the efficiency rating block 105 may include a scalability factor determination unit 530, an efficiency rating determination unit 550, and a control unit 580. In one embodiment, the control unit 580 may provide a control signal to the scalability factor determination unit 530 in response to receiving a change signal from the change detector block 119 provided in each domain to detect the change in the parameter values. In one embodiment, the scalability factor determination unit 530 may determine the scalability factor in response to receiving the control signal. In one embodiment, the scalability factor determination unit 530 may determine the scalability factor after retrieving or receiving the performance values and frequency values stored in the PMC 111-A and FV register 104-A (for domain 101-A). In one embodiment, the scalability factor may be provided to the efficiency rating determination unit 550.

In one embodiment, the efficiency rating determination block 550 may determine the efficiency rating for each domain 101-A to 101-K in response to receiving the scalability factor, cost factor stored in the PBF registers 102-A, and adjustment factor 103-A. In one embodiment, the efficiency rating determination block 550 may determine the efficiency rating using the Equation (1) as described above. In one embodiment, the efficiency rating determination block 550 may determine efficiency rating values (ER101-A, ER101-B, ER101-C, . . . ER101-K) for the domains 101-A, 101-B, 101-C, and 101-K, respectively. In one embodiment, the efficiency rating determination block 550 may provide the efficiency ratings values (ER101-A, ER101-B, ER101-C, . . . ER101-K) to the power control unit 150.

FIG. 6 illustrates a power control unit, which may use the efficiency ratings to allocate power budget to the many multi-frequency domains in accordance with one embodiment. In one embodiment, the power control unit 150 may include a power budget allocator block 660. In one embodiment, the power budget allocator block 660 may further include a sorting block 665 and a PID controller 685. In one embodiment, the sorting block 665 may receive the efficiency ratings values (ER101-A, ER101-B, ER101-C, . . . ER101-K) and sort the domains 101-A to 101-K based on the efficiency ratings values. In one embodiment, the domains 101-A and 101-C may be rated as high efficiency rating blocks as compared to 101-B. Also, the domains 101-D and 101-*k* may be rated as lower efficiency ratings block as compared to the domain 101-B. In one embodiment, the sorting block 665 may sort the domains in an order of higher efficiency ratings values (for example, [101-A, 101-C], [101-B], [101-D, 101-*k*]) in that order and an extra power budget may be allocated to the domains 101-A and 101-C to speed up the process of the workload assigned to the domains 101-A and 101-C. Further, if there is still some power budget left, the sorting block 665 may allocate the power budget to the domain 101-B and then to the domains 101-D and 101-*k*. In the above example, the domains 101-A and 101-C may be provided higher than normal clock frequency and such higher than normal frequency may be provided at the cost of lowering clock frequency to the domains 101-B, 101-D, and 101-*k* according to the efficiency ratings. Such an approach may allow better performance to be achieved for the same power cost as compared to providing default (or normal) clock frequencies to all the domains.

In other embodiment, the power budget allocator 660 may include a proportional-integral-derivative (PID) controller 685 and the PID controller 685 may allocate the power budget to the domains based on the efficiency ratings values (ER101-A, ER101-B, ER101-C, . . . ER101-K) received.

Figure 7:
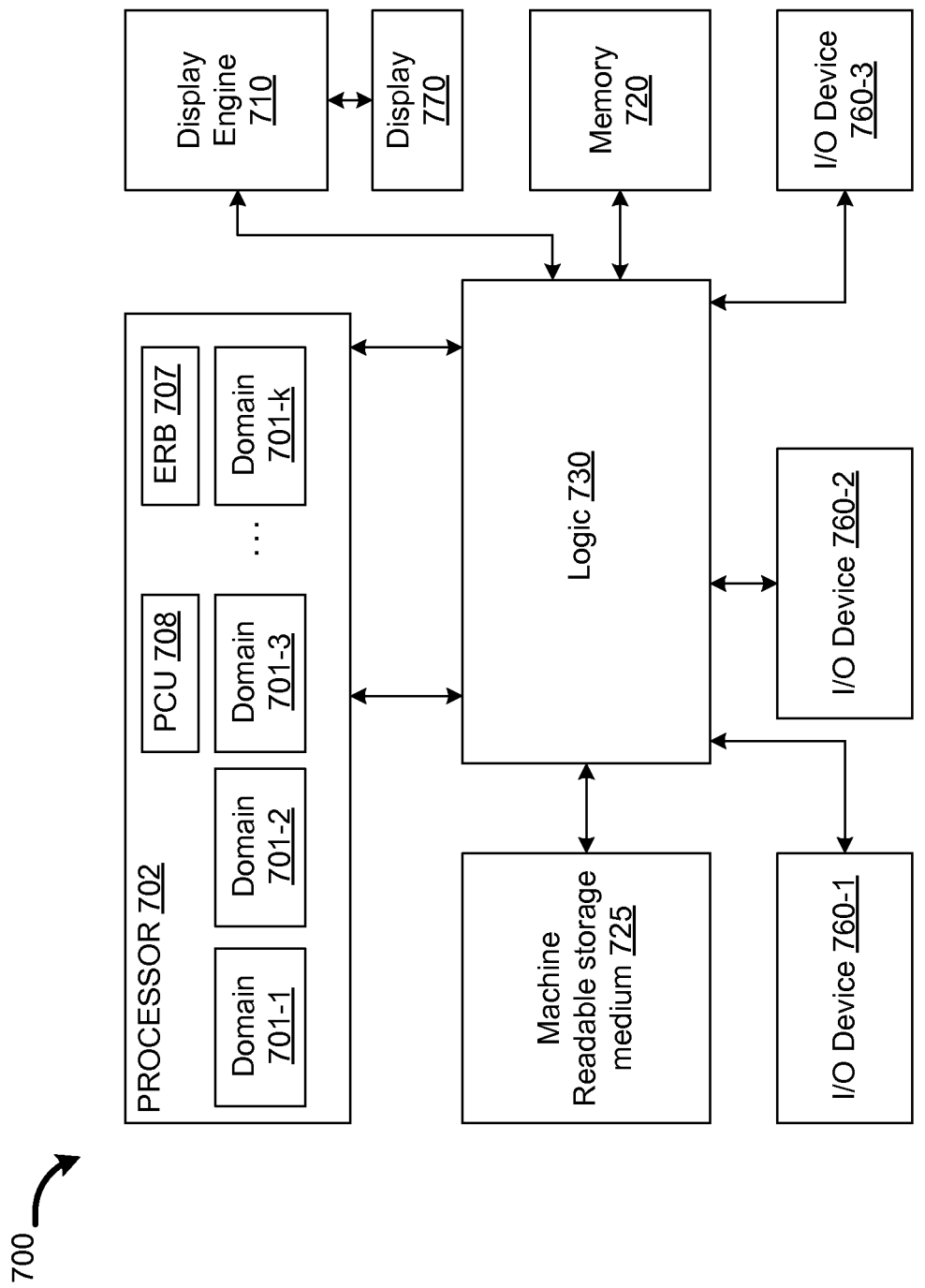
FIG. 7 illustrates a computer system 700, which may support determination of efficiency rating of many multi-frequency domains and using such efficiency rating to allocate power budget to the many multi-frequency domains in accordance with one embodiment.

FIG. 7 illustrates a computer system 700, which may support determination of efficiency rating of many multi-frequency domains and using such efficiency rating to allocate power budget to the many multi-frequency domains in accordance with one embodiment. The computer system 700 may include a processor 702, which may include multiple domains such as 701-1 to 701-K, ERB 707, and a PCU 708. For example, the domain 701-1 may include a core area of a processing core and the domain 701-2 may include an uncore area of the processing core. Further, the domain 701-3 may represent a graphics processing unit. In one embodiment, the domains may include a single instruction multiple data (SIMD) processor. In one embodiment, the ERB 707 and the power control unit 708 may together operate cooperatively to determine the efficiency ratings value for each domain 701-1 to 701-K provided in the processor 702 and allocate power budget to the domains 701-A to 701-K as described above.

The processor 702 that operates the computer system 700 may be one or more processor cores coupled to logic 730. The logic 730 may be coupled to one or more I/O devices 760, which may provide interface the computer system 700. The logic 730, for example, could be chipset logic in one embodiment. The logic 730 is coupled to the memory 720, which can be any kind of storage, including optical, magnetic, or semiconductor storage. The graphics processor unit 705 is coupled through a frame buffer to a display 740.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
   a plurality of domains, wherein at least some of the plurality of domains are to operate at different clock frequencies;
   an efficiency ratings block to determine an efficiency ratings value for each of the plurality of domains based on a calculation using a scalability factor and a cost factor of each of the plurality of domains, wherein the efficiency ratings block to determine the scalability factor as a ratio of a percentage change in performance values caused by a percentage in clock frequency, wherein the percentage change in performance values are stored in a performance monitoring counter included in each of the plurality of domains; and
   a power control unit to allocate power budget to the plurality of domains in response to receipt of the efficiency ratings value for each of the plurality of domains.

2. The processor of claim 1, wherein the efficiency ratings block to use an adjustment factor for each of the plurality of domains in the calculation to determine the efficiency ratings values for each of the plurality of domains, wherein each of the plurality of domains includes an adjustment factor register to store an adjustment factor for the corresponding domain.

3. The processor of claim 1, wherein the efficiency ratings block to determine the efficiency ratings value for each of the plurality of domains in response to a change in at least one of a parameter value provided to any of the plurality of domains.

4. The processor of claim 1, the power control unit to comprise a sorting block, wherein the sorting block to rate the plurality of domains into different rating levels in response to receipt of the efficiency ratings values and allocate power budget to the plurality of domains based on the different rating levels, wherein the sorting block to allocate maximum power budget to one or more domains having highest efficiency ratings.

5. The processor of claim 1, the power control unit to comprise a proportional-integral-derivative controller to allocate power budget to the plurality of domains based on the efficiency ratings values of the plurality of domains, wherein one or more domains having highest efficiency ratings is allocated maximum power budget.

6. The processor of claim 1, wherein the efficiency ratings block to determine the cost factor as a power budget required to increase clock frequency by a known value.

7. A method comprising:
   determining an efficiency ratings value for each of a plurality of domains using an efficiency ratings block of a processor, wherein the efficiency ratings value for each of the plurality of domains is determined based on a calculation using a scalability factor and a cost factor of each of the plurality of domains, wherein the plurality of domains are included in the processor and at least some of the plurality of domains are adapted to operate at different clock frequencies, wherein the scalability factor is determined as a ratio of a percentage change in performance values caused by a percentage change in clock frequency, wherein the percentage change in performance values are stored in a performance monitoring counter included in each of the plurality of domains; and allocating power budget to the plurality of domains using a power control unit of the processor, wherein the allocation of power budget is performed in response to receiving the efficiency ratings value for each of the plurality of domains.

8. The method of claim 7, further comprising using an adjustment factor for each of the plurality of domains in the calculation to determine the efficiency ratings value for each of the plurality of domains, wherein each of the plurality of domains includes an adjustment factor register to store an adjustment factor for the corresponding domain.

9. The method of claim 7, wherein the efficiency ratings values for each of the plurality of domains is determined in response to a change in at least one parameter value provided to any of the plurality of domains.

10. The method of claim 7, further comprising:
rating the plurality of domains into different rating levels in response to receiving the efficiency ratings values; and
allocating power budget to the plurality of domains based on the different rating levels, wherein maximum power budget is allocated to one or more domains having highest efficiency ratings.

11. The method of claim 7, further including allocating power budget to the plurality of domains based on the efficiency ratings values of the plurality of domains using a proportional-integral-derivative controller, wherein maximum power budget is allocated to one or more domains having highest efficiency ratings.

12. The method of claim 7, wherein the cost factor is to be determined as a power budget required to increase clock frequency by a known value.

13. A computer system comprising:
a plurality of input-output devices;
a logic coupled to the plurality of input-output devices;
a display device coupled to the logic;
a non-transitory machine readable storage medium coupled to the logic; and
a processor coupled to the logic, wherein the processor includes:
a plurality of domains, wherein at least some of the plurality of domains are to operate at different clock frequencies;
an efficiency ratings block to determine an efficiency ratings value for each of the plurality of domains based on a calculation of a scalability factor and a cost factor of each of the plurality of domains, wherein the efficiency ratings block to determine the scalability factor as a ratio of a percentage change in performance values caused by a percentage change in clock frequency, wherein the percentage change in performance values are stored in a performance monitoring counter included in each of the plurality of domains; and
a power control unit to allocate power budget to the plurality of domains in response to receipt of the efficiency ratings value for each of the plurality of domains.

14. The computer system of claim 13, wherein the efficiency ratings block to use an adjustment factor for each of the plurality of domains in the calculation to determine the efficiency ratings values for each of the plurality of domains, wherein each of the plurality of domains includes an adjustment factor register to store an adjustment factor for the corresponding domain.

15. The computer system of claim 13, wherein the efficiency ratings block to determine the efficiency ratings values for each of the plurality of domains in response to a change in at least one parameter value provided to any of the plurality of domains.

16. The computer system of claim 13, the power control unit to comprise a sorting block, wherein the sorting block to rate the plurality of domains into different rating levels in response to receipt of the efficiency ratings values.

17. The computer system of claim 16, wherein the sorting block to allocate power budget to the plurality of domains based on the different rating levels, wherein the sorting block to allocate maximum power budget to one or more domains having highest efficiency ratings.

18. The computer system of claim 13, the power control unit to comprise a proportional-integral-derivative controller to allocate power budget to the plurality of domains based on the efficiency ratings values of the plurality of domains, wherein one or more domains having highest efficiency ratings is allocated maximum power budget.

19. The computer system of claim 13, wherein the efficiency ratings block to determine the cost factor as a power budget required to increase clock frequency by a known value.

* * * * *

UNITED STATES PATENT AND TRADEMARK OFFICE
CERTIFICATE OF CORRECTION

PATENT NO.         : 9,239,611 B2                                    Page 1 of 1
APPLICATION NO.    : 13/311467
DATED              : January 19, 2016
INVENTOR(S)        : Seongwoo Kim et al.

It is certified that error appears in the above-identified patent and that said Letters Patent is hereby corrected as shown below:

IN THE CLAIMS

Column 12:
Line 30, after "percentage", insert --change--.

Signed and Sealed this
Nineteenth Day of April, 2016

Michelle K. Lee
*Director of the United States Patent and Trademark Office*